(12) United States Patent
McKean et al.

(10) Patent No.: US 11,587,145 B1
(45) Date of Patent: Feb. 21, 2023

(54) SYSTEM, METHOD, AND NON-TRANSITORY COMPUTER-READABLE MEDIUM FOR ARTIFICIAL INTELLIGENCE PRE-FILLING GROCERY CART

(71) Applicant: HUNGRYROOT, INC., New York, NY (US)

(72) Inventors: Benjamin Pierce McKean, Mooresville, NC (US); Da Kong, Syosset, NY (US); Luke Joseph Vaccaro, Westfield, NJ (US); Rachel Lynn Donze, Brooklyn, NY (US); Jiaming Zhang, New York, NY (US); Alex Weinstein, Bellevue, WA (US)

(73) Assignee: HUNGRYROOT, INC., New York, NY (US)

( * ) Notice: Subject to any disclaimer, the term of this patent is extended or adjusted under 35 U.S.C. 154(b) by 0 days.

(21) Appl. No.: 17/586,425

(22) Filed: Jan. 27, 2022

(51) Int. Cl.
*G06Q 30/00* (2012.01)
*G06Q 30/0601* (2023.01)

(52) U.S. Cl.
CPC ..... *G06Q 30/0631* (2013.01); *G06Q 30/0635* (2013.01)

(58) Field of Classification Search
CPC ........................................ G06Q 30/0601–0645
USPC ............................................... 705/26.1–27.2
See application file for complete search history.

(56) References Cited

U.S. PATENT DOCUMENTS

| | | | | |
|---|---|---|---|---|
| 9,165,320 | B1 * | 10/2015 | Belvin | G06Q 30/0633 |
| 10,861,076 | B1 * | 12/2020 | Neumann | G06N 20/00 |
| 2012/0322032 | A1 * | 12/2012 | Smith | G06Q 30/0633 |
| | | | | 434/127 |
| 2017/0316488 | A1 * | 11/2017 | Kremen | G09B 5/06 |
| 2018/0096411 | A1 * | 4/2018 | Charles | G06Q 30/0238 |
| 2018/0165747 | A1 * | 6/2018 | Patten | G06Q 30/0603 |
| 2018/0218434 | A1 * | 8/2018 | Smith | G06Q 30/0251 |
| 2018/0218461 | A1 * | 8/2018 | Pulley | G06Q 30/0643 |
| 2019/0188776 | A1 * | 6/2019 | Hammond | G06Q 30/0633 |

(Continued)

OTHER PUBLICATIONS

Alemany Bordera, Jose & Heras, Stella & Palanca, J. & Julián, Vicente. (2016). An Agent-Based Application for Automatic Classification of Food Allergies and Intolerances in Recipes. 10.1007/978-3-319-39324-7_1. (Year: 2016).*

(Continued)

*Primary Examiner* — Jeffrey A. Smith
*Assistant Examiner* — Kennedy Gibson-Wynn
(74) *Attorney, Agent, or Firm* — Seed IP Law Group LLP

(57) ABSTRACT

Systems and methods to predict and optimize automated recipe selection and item delivery for a customer. An item-selection server selects a plurality of predicted recipes based on customer preferences and order history. Hard and soft constraints are obtained to perform the optimization of the predicted recipes. The hard constraints define parameters that cannot be violated by a recipe or set of recipes, and soft constraints define parameters that expresses a tradeoff value associated with a recipe or set of recipes. Optimization includes selecting multiple sets of predicted recipes based on the hard constraints and scoring each recipe set based on the soft constraints, item inventory, and customer preferences. A specific set of recipes is selected for the order based on the scores, and the filling of the order is initiated for the customer with items associated with the selected set of recipes.

19 Claims, 6 Drawing Sheets

(56) References Cited

U.S. PATENT DOCUMENTS

| 2019/0228855 | A1* | 7/2019 | Leifer | G06N 5/04 |
| 2019/0243922 | A1* | 8/2019 | Pinel | G06Q 30/0631 |
| 2020/0311644 | A1* | 10/2020 | Willard, III | G06Q 30/0601 |
| 2020/0394727 | A1* | 12/2020 | Shadrokh | G06N 5/02 |

OTHER PUBLICATIONS

Thi Ngoc, Trang Tran, et al. "An Overview of Recommender Systems in the Healthy Food Domain." Journal of Intelligent Information Systems 50.3 (2018): 501-26. ProQuest. Web. Apr. 8, 2022. (Year: 2018).*

Amaro, Ana Margarida. "Nutrially-Efficientand Personalised Meal Recommendations." Order No. 29150637 Universidade do Porto (Portugal), 2021. Ann Arbor: ProQuest. Web. Jul. 26, 2022. (Year: 2021).*

"Yummly 2.0 Will Integrate Curated Cooking Experiences into Whirlpool® Kitchen Appliances: App Identifies Recipes, Orders Groceries and Sends Recipes to Appliances as Yummly and Whirlpool Simplify Meal Time." PR Newswire, Jan. 8, 2018, ProQuest. Web. Oct. 6, 2022 . (Year: 2018).*

* cited by examiner

SYSTEM, METHOD, AND NON-TRANSITORY COMPUTER-READABLE MEDIUM FOR ARTIFICIAL INTELLIGENCE PRE-FILLING GROCERY CART

TECHNICAL FIELD

The present disclosure relates generally to online food distribution services and, more particularly, to utilizing artificial intelligence mechanisms to predict and optimize customer orders.

BACKGROUND

Description of the Related Art

The use of online food and grocery ordering has gained in popularity over the past few years. Many of these online services allow customers to select which grocery items they wish to purchase using an online computer interface. After the customer selects and pays for their grocery items, a "runner" collects the items from the shelves such that the customer can simply pick up their order and take it home. Some systems also allow for the items to be sent directly to the customer's home. These systems, however, generally require the customer to know which grocery items they wish to purchase. Some newer systems have added the option of a customer selecting a particular recipe. The specific items and their portions for that particular recipe are then sent to the customer. Upon arrival, the customer can prepare the recipe using the items provided. Unfortunately, many of these online food-purchasing systems are limited by the customer's input and provide little flexibility in how the grocery items and recipes are utilized. It is with respect to these and other considerations that the embodiments described herein have been made.

BRIEF SUMMARY

Briefly described, embodiments are directed toward systems and methods of predicting and optimizing automated recipe selection and item delivery for a customer. A request for a customer order is received from a customer. One or more hard constraints for the customer and the order are obtained. These hard constraints define at least one first parameter that cannot be violated by a recipe or set of recipes for the customer. One or more soft constraints are also obtained for the order. These soft constraints define at least one second parameter that expresses a tradeoff value associated with a recipe or set of recipes for the customer. A plurality of predicted recipes are selected from a plurality of recipes in a recipe database for the order based on preferences and implicit behaviors of the customer and an order history of the customer. A plurality of sets of recipes (recipe sets) can be generated from the plurality of predicted recipes based on the one or more hard constraints. Each recipe set is scored based on the one or more soft constraints, an inventory of items for the plurality of sets of recipes, and the customer preferences. A set of recipes is then selected for the order based on the recipe set scores, which results in the pre-filling of the customer's grocery cart. In some embodiments, the customer may make changes to the pre-filled cart, such as by modifying a recipe in the selected set of recipes or modifying or swapping an item associated with the set of recipes. The filling of the order for the customer can then be initiated with the items associated with the selected set of recipes.

In some embodiments, the plurality of predicted recipes may be selected by employing one or more artificial intelligence mechanisms to train the model using the preferences, behaviors, and the order histories of a plurality of customers. Accordingly, an artificial intelligence model may be trained to select the plurality of predicted recipes based on at least two criteria selected from item attributes, customer dietary preferences, customer dietary restrictions, customer configurations, and past customer customizations of items.

In various embodiments, the plurality of sets of recipes may be generated by evaluating one or more hard constraints. For example, a maximum number of recipes for each set of the plurality of sets of recipes may be selected. A plurality of possible sets of recipes is generated to include different combinations of predicted recipes from the plurality of predicted recipes based on the maximum number of recipes in a set. In some embodiments, the plurality of sets of recipes may be generated by discarding one or more sets from the plurality of possible sets in response to a recipe in the one or more sets having an item that is an allergen to the customer. In other embodiments, the plurality of sets of recipes may be generated by discarding one or more sets from the plurality of possible sets in response to a recipe in the one or more sets having an item that is restricted by the customer. In yet other embodiments, the plurality of sets of recipes may be generated by discarding one or more sets from the plurality of possible sets in response to a recipe or an item in the one or more sets being prohibited by the customer. In some other embodiments, a list of items for each of the plurality of possible sets may be generated, and a packaging volume for the list of items may be generated for each of the plurality of possible sets. The plurality of sets of recipes can then be generated by discarding one or more sets from the plurality of possible sets in response to the one or more sets having a packaging volume that exceeds a selected threshold. In yet other embodiments, the plurality of sets of recipes may be generated by discarding one or more sets from the plurality of possible sets in response to the one or more sets having a number of items in the list of items exceeding a selected threshold.

Each recipe set of the plurality of sets of recipes may be scored by evaluating and employing a plurality of soft constraints. In some embodiments, a list of items is generated for recipes in each corresponding set of the plurality of sets. An inventory availability is determined for each item in the list of items for the corresponding set, and the score of the corresponding set is modified based on the determined inventory availability. In other embodiments, a cost is determined for each corresponding set based on a price of each item in the list of items for the corresponding set, and the score of the corresponding set is modified based on the determined cost relative to the customer-selected maximum cost and the customer-selected minimum cost.

In some other embodiments, a number of meals associated with each corresponding set may be determined, and the score of the corresponding set may be modified based on the determined number of meals being over or under the customer-selected number of meals. In yet other embodiments, a number of meals associated with each corresponding set for a selected mealtime may be determined, the score of the corresponding set may be modified based on the determined number of meals being over or under the customer-selected number of meals for the selected mealtime. In some embodiments, the score of each corresponding set may be modified based on a recipe in the corresponding set being previously provided to the customer. In other embodiments, the score of each corresponding set may be modified based on two recipes in the corresponding set having at least one overlapping item. In various embodiments, the score of each corresponding set may be increased in response to the corresponding set matching the at least one customer-selected preference, and the score of each corresponding set may be decreased in response to the corresponding set failing to match the at least one customer-selected preference.

Embodiments described herein can improve the operation of the item delivery computing systems, reduce errors in item deliveries, improve customer satisfaction, reduce the amount of food waste in the customers' home and at the fulfillment warehouse, and even improve the operation of the various computing components of the system. For example, by predicting which recipes a customer may want and then optimizing those recipes, a more accurate set of recipes can be selected for the customer, which can result in fewer computing resources being utilized to coordinate a return of items or the delivery of additional items.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
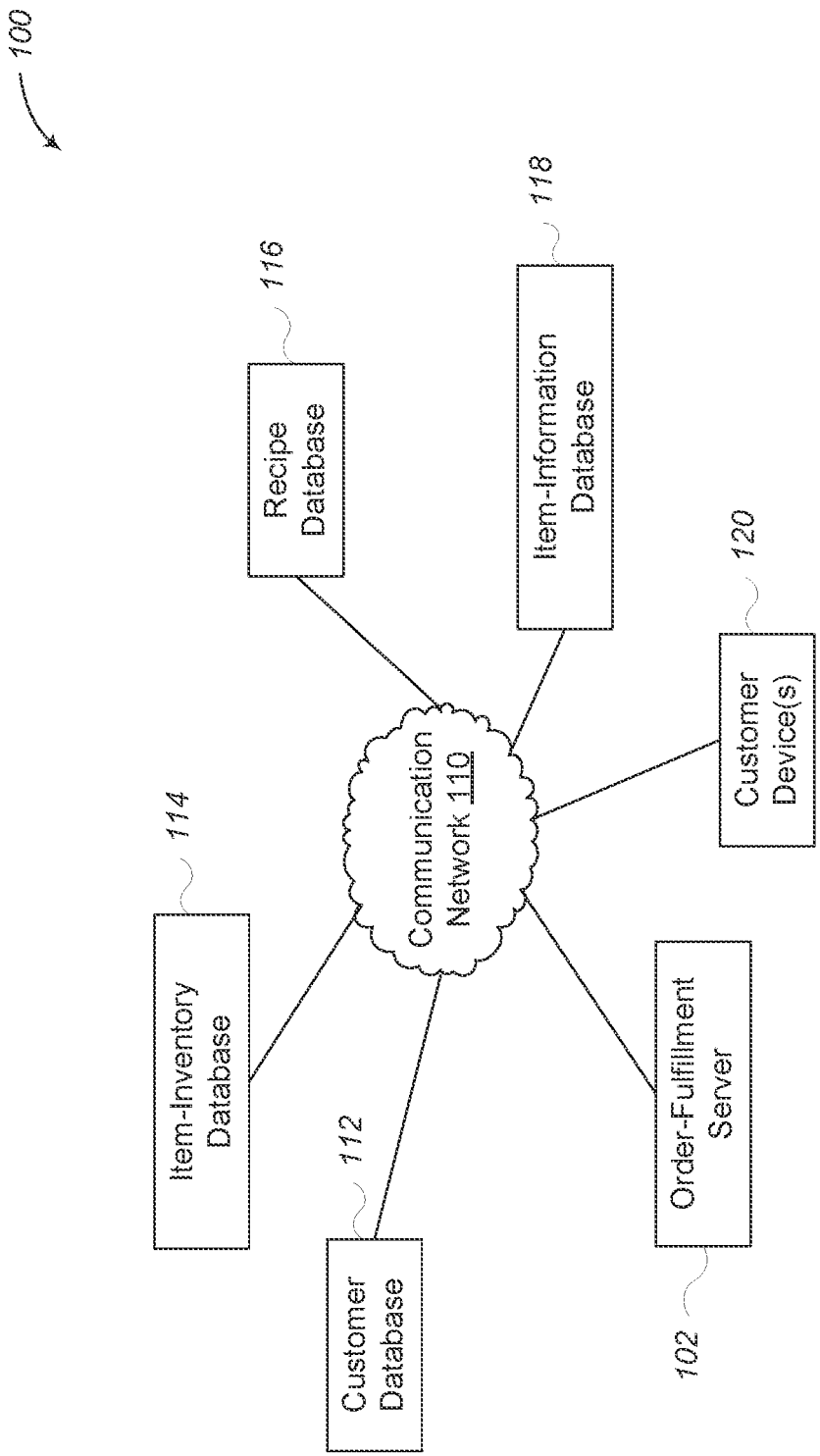
FIG. 1 illustrates a context diagram of an environment for predicting and optimizing customer recipe orders in accordance with embodiments described herein.

FIG. 1 illustrates a context diagram of an environment 100 for predicting and optimizing customer recipe orders in accordance with embodiments described herein. In this example, environment 100 includes an order-fulfillment server 102, a customer database 112, an item-inventory database 114, a recipe database 116, an item-information database 118, and a customer devices 120. These computing devices can communicate with one another via communication network 110. Communication network 110 includes one or more wired or wireless networks in which data or communication messages are transmitted between various computing devices.

The order-fulfillment server 102 is a computing device that predicts which recipes a customer of customer devices 120 may enjoy and optimize those recipes to select a set of recipes to provide to the customer. The order-fulfillment server 102 receives an order request from a customer device 120. Utilizes customer preferences and customer history information to predict a plurality of recipes for the customer. The order-fulfillment server 102 can then use hard constraints and soft constraints to optimize and score the predicted recipes into a plurality of sets of recipes. The order-fulfillment server 102 selects one of these sets of recipes to provide to the user. The order-fulfillment server 102 can then initiate delivery of the items and recipes associated with the selected set of recipes to the customer to fulfill the order.

The customer devices 120 are computing devices that can communicate with the order-fulfillment server 102 to provide customer preferences, request a recipe set and corresponding items be delivered to the customer, modify one or more items or recipes associated with a recipe set that is selected for delivery to the customer, etc.

The customer database 112 is a computing device that is configured to store customer information. This customer information may include, but is not limited to, customer preferences, customer order history, customer customization history, list of items previously provided to the customer, current customer inventory (e.g., items or ingredients already owned by the customer), etc. The customer database 112 is further configured to communicate with the order-fulfillment server 102 via the communication network 110 to provide various customer information to the order-fulfillment server 102 to enable the order-fulfillment server 102 to predict and optimize recipes for customers, as described herein.

The recipe database 116 is a computing device that is configured to store a plurality of recipes. The recipe database 116 is configured to communicate with the order-fulfillment server 102 via the communication network 110 to provide lists of recipes and their items to the order-fulfillment server 102 for the order-fulfillment server 102 to predict and optimize recipes for customers, as described herein.

The item-inventory database 114 is a computing device configured to store inventory information regarding a plurality of items that are associated with at least one recipe stored by the recipe database 116 and can be delivered to a customer. The item-inventory database 114 is further configured to communicate with the order-fulfillment server 102 via the communication network 110 to provide item-inventory information to the order-fulfillment server 102 for the order-fulfillment server 102 to optimize recipes for customers, as described herein.

The item-information database 118 is a computing device that is configured to store information regarding the plurality of items that are associated with at least one recipe stored by the recipe database 116. This item information may include, but is not limited to, dietary information, specific ingredients, cost or price, volume metrics, etc. The item-information database 118 is further configured to communicate with the order-fulfillment server 102 via the communication network 110 to provide item information to the order-fulfillment server 102 for the order-fulfillment server 102 to optimize recipes for customers, as described herein.

Although the order-fulfillment server 102, the customer database 112, the item-inventory database 114, the recipe database 116, and the item-information database 118 are illustrated as separate computing devices, embodiments are not so limited. Rather one or more computing devices or systems may be utilized to perform the functionality of the order-fulfillment server 102, the customer database 112, the item-inventory database 114, the recipe database 116, and the item-information database 118. Accordingly, in some embodiments, the order-fulfillment server 102 may store or manage the customer database 112, the item-inventory database 114, the recipe database 116, or the item-information database 118, or some combination thereof.

Figure 2:
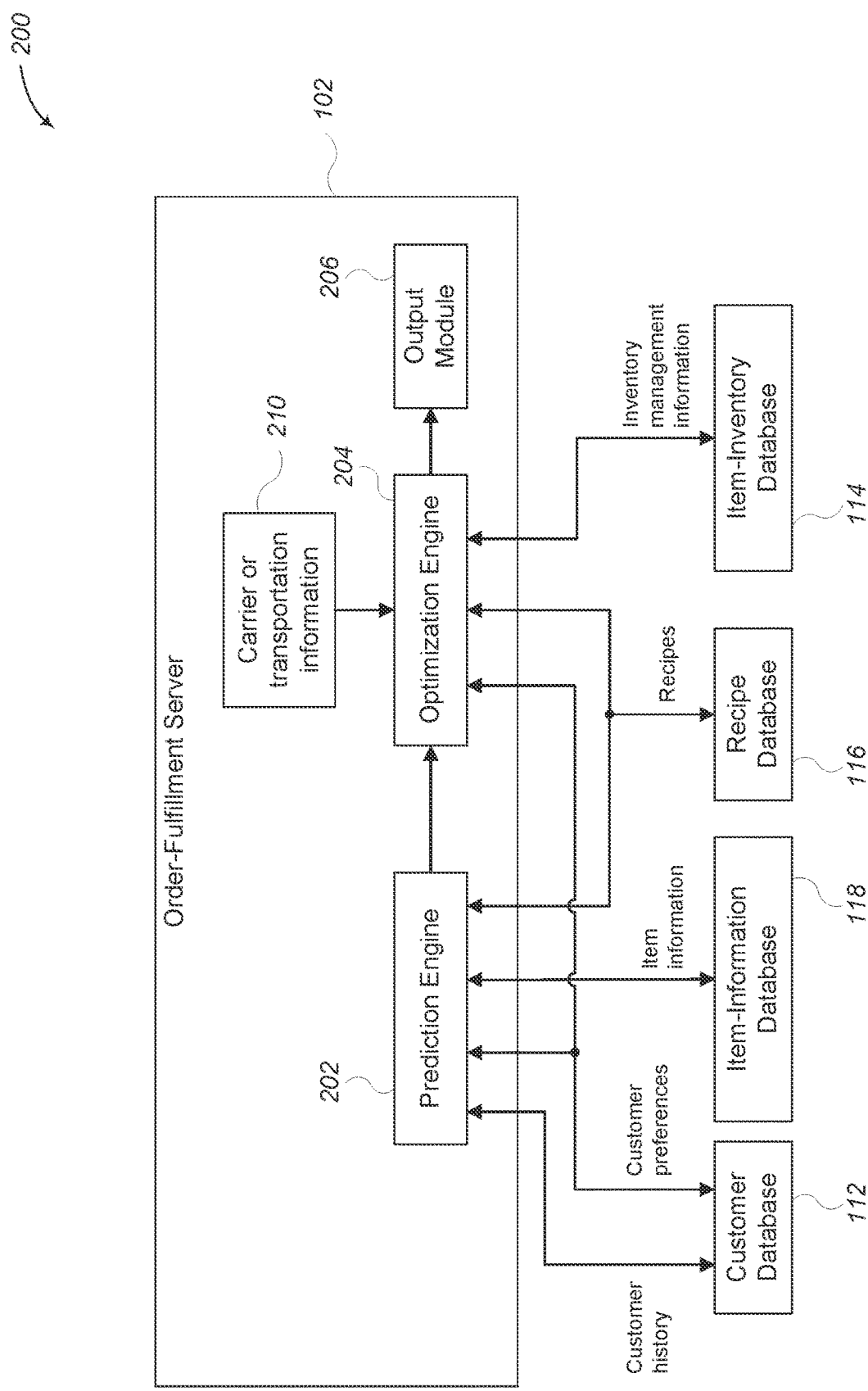
FIG. 2 is a context diagram of non-limiting embodiments of systems for obtaining data utilized in the predicting and optimizing of customer recipe orders in accordance with embodiments described herein.

FIG. 2 is a context diagram of non-limiting embodiments of systems for obtaining data utilized in the predicting and optimizing of customer recipe orders in accordance with embodiments described herein. Example 200 includes an order-fulfillment server 102, a customer database 112, an item-inventory database 114, a recipe database 116, and an item-information database 118, which are similar to what is discussed above in conjunction with FIG. 1.

The order-fulfillment server 102 includes a prediction engine 202, an optimization engine 204, and an output module 206. In some embodiments, the order-fulfillment server 102 may also store carrier or transportation information 210.

The prediction engine 202 receives an order request from a customer. The prediction engine 202 obtains a variety of customer-related information from the customer database 112. For example, the prediction engine 202 collects customer history information, customer preferences, and the customer's current inventory from the customer database 112. The prediction engine 202 also obtains a list of all possible recipes for the customer from the recipe database 116. The prediction engine 202 can use the list of recipes to collect item information for the recipes from the item-information database 118. This item information may include dietary information or specific ingredients for each recipe. In some embodiments, the item information may be included with the list of recipes received from the recipe database 116. The prediction engine 202 utilizes the recipes and the item information, along with the customer history and preferences, as input to one or more artificial intelligence learning models to predict which recipes the customer may like. The prediction engine 202 provides a list of predicted recipes to the optimization engine 204.

The optimization engine 204 queries the recipe database 116 to identify a list of items for each predicted recipe. The optimization engine 204 obtains additional item information for the listed from the item-information database 118. The optimization engine 204 can also obtain inventory management information for the listed items from the item-inventory database 114. The optimization engine 204 utilizes the predicted recipes, the additional item information, and the inventory information to optimize the predicted recipes, as described herein. In various embodiments, the optimization engine 204 also utilizes customer information (e.g., as obtained from customer database 112 to optimize the predicted recipes, which allows the system to not only select recipes that the customer may like, but also to select recipes that utilize items already owned by the customer. In some embodiments, the optimization engine 204 generates a plurality of sets of recipes, while evaluating each recipe set and individual recipe to one or more hard constraints. The optimization engine 204 discards those recipe sets that violate at least one hard constraint. The optimization engine 204 can then score the remaining predicted recipes using a plurality of soft constraints, as discussed herein.

In some embodiments, the optimization engine 204 can optimize recipe sets across a plurality of customers. For example, the prediction engine 202 can separately generate a plurality of predicted recipes for each of a plurality of customers. The optimization engine 204 separately evaluate each plurality of predicted recipes with respect to hard constraints and soft constraints. The optimization engine 204 can then evaluate one or more additional soft constraints that are evaluated among multiple pluralities of predicted recipes. One example of such a soft constraint may be inventory status relative to customer preferences. For example, if a first customer "likes" chicken and a second customer "loves" chicken, but the chicken inventory is low, then the recipe set scores for the first customer that include chicken may be reduced, and the recipe set scores for the second customer that include chicken may be increased.

In some embodiments, the optimization engine 204 can also use the carrier or transportation information 210 to optimize the predicted recipes. For example, if a carrier is delayed or if there are shipping issues regarding one or more items, then the optimization engine 204 can reduce the score of those recipe sets that include items that may experience shipping, transportation, or inventory issues. The optimization engine 204 provides a plurality of optimized recipe sets to the output module 206.

The output module 206 selects a set of recipes from the plurality of optimized recipe sets. In at least one embodiment, the output module 206 selects a highest scoring recipe set. The output module 206 can then initiate fulfillment of the customer's order with the items associated with the selected recipe set.

In some embodiments, the output module 206 may optionally present one or more of the plurality of optimized recipe sets to the customer prior to the fulfillment of the customer's order. In various embodiments, the output module 206 may display a selected number of highest scoring recipe sets to the customer, such as via customer device 120. In other embodiments, the output module 206 may identify two or more recipes that share one or more characteristics (e.g., cost, packaging size, cuisine, ingredient, etc.) and present those recipes to the customer. In at least one such embodiment, the system may enable the customer to select between one or more of these recipes to be included in the order. For example, the output module 206 may display a list of two pasta recipes, such that the customer can select one to include in the order.

The operation of certain aspects will now be described with respect to FIGS. 3-5. In at least one of various embodiments, processes 300, 400, or 500 described in conjunction with FIGS. 3-5, respectively, may be implemented by or executed via circuitry or on one or more computing devices, such as order-fulfillment server 102 in FIG. 1.

Figure 3:
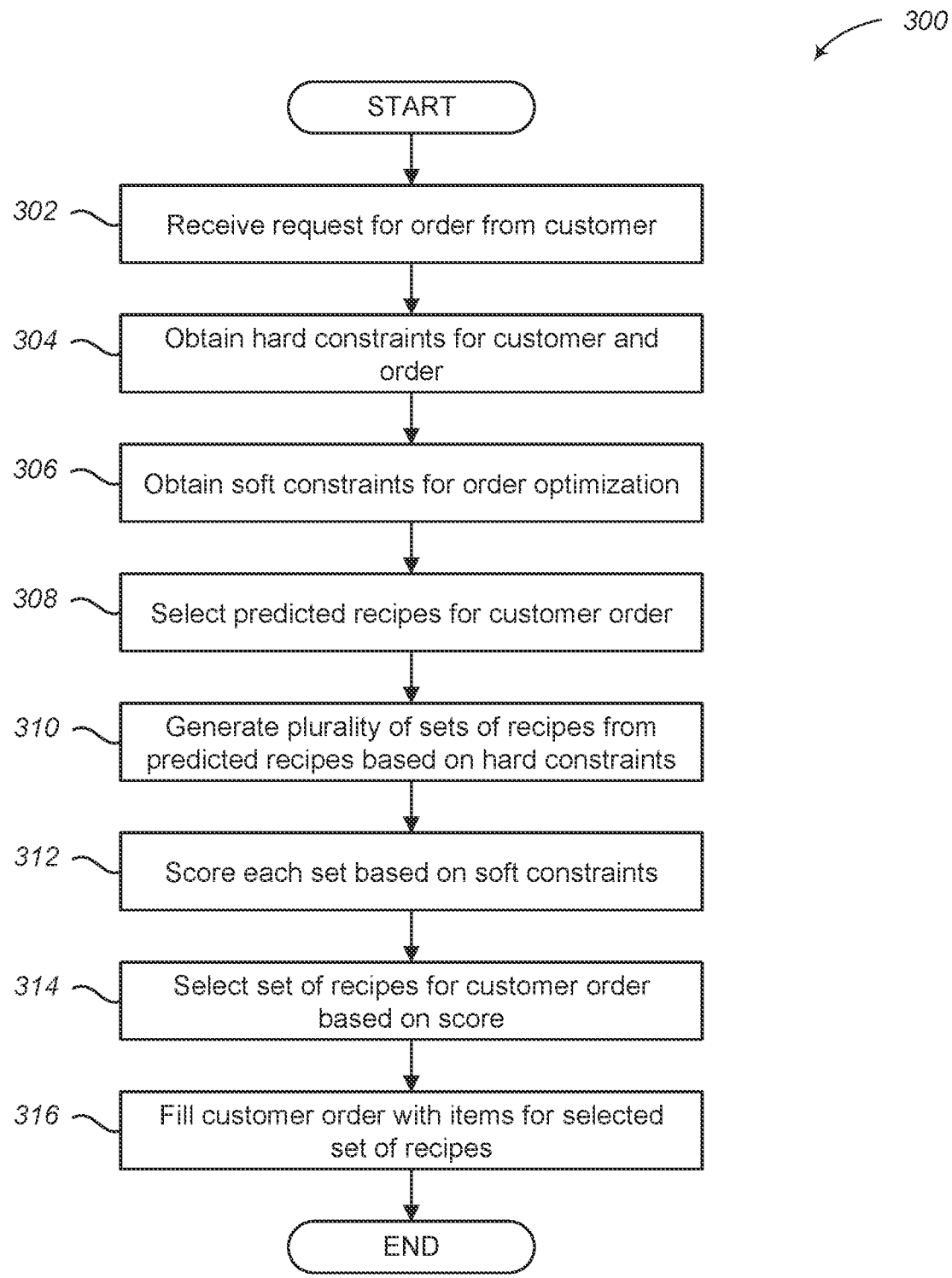
FIG. 3 illustrates a logical flow diagram showing one embodiment of a process for predicting and optimizing a customer recipe order in accordance with embodiments described herein.

FIG. 3 illustrates a logical flow diagram showing one embodiment of a process 300 for predicting and optimizing a customer recipe order in accordance with embodiments described herein.

Process 300 begins, after a start block, at block 302, where a request for an order is received from a customer. In various embodiments, the customer may setup or schedule orders for deliveries on specific days, at specific time intervals, or for specific occasions. As described herein, an order is a request for a set of recipes, and the items needed to make those recipes, to be delivered to the customer. Items are objects provided with the recipes for the customer to make the recipes. Items may include the various ingredients or food products needed to make the recipes. In some embodiments, items may also include cooking utensils, measurement tools, or other non-food objects needed to make the recipes.

Process 300 proceeds to block 304, where one or more hard constraints are obtained for the customer and the order. The hard constraints define at least one parameter that cannot be violated by a recipe or set of recipes for the customer. In various embodiments, the hard constraints may be in two groups, a first group of one or more hard constraints that are evaluated at the recipe-set level and a second group of one or more hard constraints that are evaluated at the recipe level. Accordingly, a set of a plurality of recipes selected for the customer may not violate a hard constraint from the first group of hard constraints and an individual recipe in a recipe set may not violate a hard constraint from the second group of hard constraints. Any violations of a hard constraint will result in the corresponding set of recipes to be discarded and not provided to the customer.

Examples, of hard constraints may include, but are not limited to:

A recipe set cannot contain a recipe that includes an item that is an allergen to the customer (e.g., a recipe cannot contain an item that includes peanuts as an ingredient).

A recipe set cannot contain a recipe that includes an item that is restricted by the customer (e.g., no chicken as an item). A customer may identify an item as being restricted because the customer does not like the item.

A recipe set cannot contain a recipe or item prohibited by the customer (e.g., a recipe cannot include dairy products). A customer may identify a recipe or item as being prohibited because of a dietary restriction (e.g., the customer is allergic to an ingredient in the item or recipe).

A recipe set cannot have a cost that exceeds a customer-selected or company-defined or administrator-selected maximum cost.

A recipe set cannot have a total packaging volume exceeding a maximum volume (e.g., the items for a set of recipes cannot exceed a selected shipping-box volume).

A recipe set cannot have a total number of items that exceeds a maximum number of items.

A recipe set cannot include an item have more servings than a select threshold.

These examples of hard constraints are for illustrative purposes and are not intended to be limiting. In various embodiments, the hard constraints may be input or modified by an administrator.

Process 300 continues to block 306, where one or more soft constraints are obtained for order optimization. The soft constraints define at least one parameter that expresses a tradeoff value associated with a recipe or set of recipes for the customer. As discussed in more detail herein, the soft constraints may be utilized to score a recipe or set of recipes. Accordingly, evaluation of one or more soft constraints may result in an increase or a reduction of a recipe set score.

Examples of soft constraints may include, but are not limited to:

Item inventory relative to a minimum or maximum inventory:

An item that is out of stock or under an inventory minimum (e.g., recipe set score be decreased if an item of a recipe in that recipe set is out of stock—so as to discourage use of that item in a recipe set).

An item that is in stock or over an inventory maximum (e.g., a recipe set score may be increased if the inventory of an item of a recipe in that recipe set exceeds an inventor maximum—so as to encourage use of that item in a recipe set to reduce the inventory of that item).

A recipe set having a cost that exceeds a minimum or maximum customer-selected cost (e.g., a recipe set score may be decreased a first amount if the recipe set has an aggregated item price that exceeds the customer-selected maximum cost, and the recipe set score may be decreased a second, smaller amount if the recipe set has an aggregated item price that exceeds the customer-selected minimum cost).

A recipe set that exceeds a maximum or minimum number of meals for the customer (e.g., a recipe set score may be decreased a first amount if the recipe set includes a number of meals less than a customer-selected number of meals, and the recipe set score may be decreased a second, smaller amount if the recipe set includes a number of meals over the customer-selected number of meals).

A recipe set that has an incorrect number of servings for different customer-selected mealtimes (e.g., a recipe set score may be decreased one or more amounts based on a type of serving missing for different mealtimes).

A recipe set that includes multiple recipes having at least one overlapping item (e.g., a recipe set score may be decreased for each duplicate item among recipes in the recipe set).

A recipe set having a recipe that was previously provided to the customer (e.g., a recipe set score may be decreased a first amount for a repeated recipe within a first threshold amount of time, or the recipe set score may be decreased a second, higher amount for a repeat of two or more recipes from a same set within a second, longer threshold amount of time).

A recipe set matching at least one customer preference (e.g., a recipe set score may be increased a first amount if an item or recipe in the recipe set matches a first customer preference, and the recipe score may be increased a second, higher amount if an item or recipe in the recipe set matches a second customer preference).

A recipe set failing to match at least one customer preference (e.g., a recipe set score may be decreased a first amount if an item or recipe in the recipe set fails to match a first customer preference, and the recipe score may be decreased a second, higher amount if an item or recipe in the recipe set fails to match a second customer preference).

A recipe set score relative to aggregated customer feedback.

Customers "liking" or "disliking" a recipe in the recipe set.

Customers "liking" or "disliking" an item or ingredient associated with a recipe in the recipe set.

A recipe set containing items already owned by the customer.

These examples of soft constraints are for illustrative purposes and are not intended to be limiting. In various embodiments, the soft constraints may be input or modified by an administrator.

Process 300 proceeds next to block 308, where a plurality of predicted recipes are selected for the customer order, which is described in more detail below in conjunction with FIG. 4. Briefly, however, customer preferences and the customer's order history are utilized to predict which recipes the customer should enjoy.

Process 300 continues at blocks 310 and 312, where the plurality of predicted recipes are optimized for the customer's order.

First, at block 310, a plurality of sets of recipes are generated from the plurality of predicted recipes, which is described in more detail below in conjunction with FIG. 5. Briefly, however, each recipe and set of recipes is compared to the hard constraints to determine which recipe sets satisfy the hard constraints.

Second, at block 312, each recipe set is scored based on the soft constraints. In some embodiments, an inventory of items for each item associated with a recipe in the generated recipe sets is obtained from an inventory database, such as item-inventory database 114 in FIG. 1. Similarly, the customer's preferences may be obtained from a customer database, such as customer database 112 in FIG. 1.

Each recipe set is compared to the soft constraints, and a recipe set score is modified based on how well that recipe set follows the soft constraints. For example, if the cost of a recipe set exceeds the customer-selected maximum cost, then the score for that recipe set is reduced an amount determined by that soft constraint. As another example, the score for a recipe set may be modified based on whether the customer, or other customers, have "liked" or "disliked" specific recipes or items (e.g., specific ingredients or specific instructions or specific utensils needed to execute the recipe) associated with the recipe set. As another example, the customer may provide information regarding currently owned items. The score of a recipe set may be increased if the customer already owns an item associated with the recipe set.

Process 300 proceeds next to block 314, where a set of recipes is selected for the customer order based on the scores generated at block 312. In various embodiments, a highest scoring recipe set is selected for the customer order. In other embodiments, a recipe set is randomly selected from those recipe sets having a score above a selected threshold. This threshold may be selected or set by an administrator or by the customer. For example, a customer may lower the score threshold to introduce more variety into the recipe sets being selected for the customer. Conversely, the customer may raise the score threshold to reduce variety and cause the system to select recipe sets that more closely align with the customer's preferences or history.

Process 300 continues to block 316, where the customer order is filled with items for the selected set of recipes. In some embodiments, automated item selection robotic mechanisms may be controlled to select the items from one or more shelves in an item warehouse and fill a delivery box with those items. In other embodiments, a list of items for the selected set of recipes is output to a warehouse worker to enable that worker to collect the items and fill the delivery box.

After block 316, process 300 may terminate or otherwise return to a calling process to perform other actions. For example, in some embodiments, process 300 may loop (not illustrated) to block 302 to receive another order request for the same customer or for a different customer.

Figure 4:
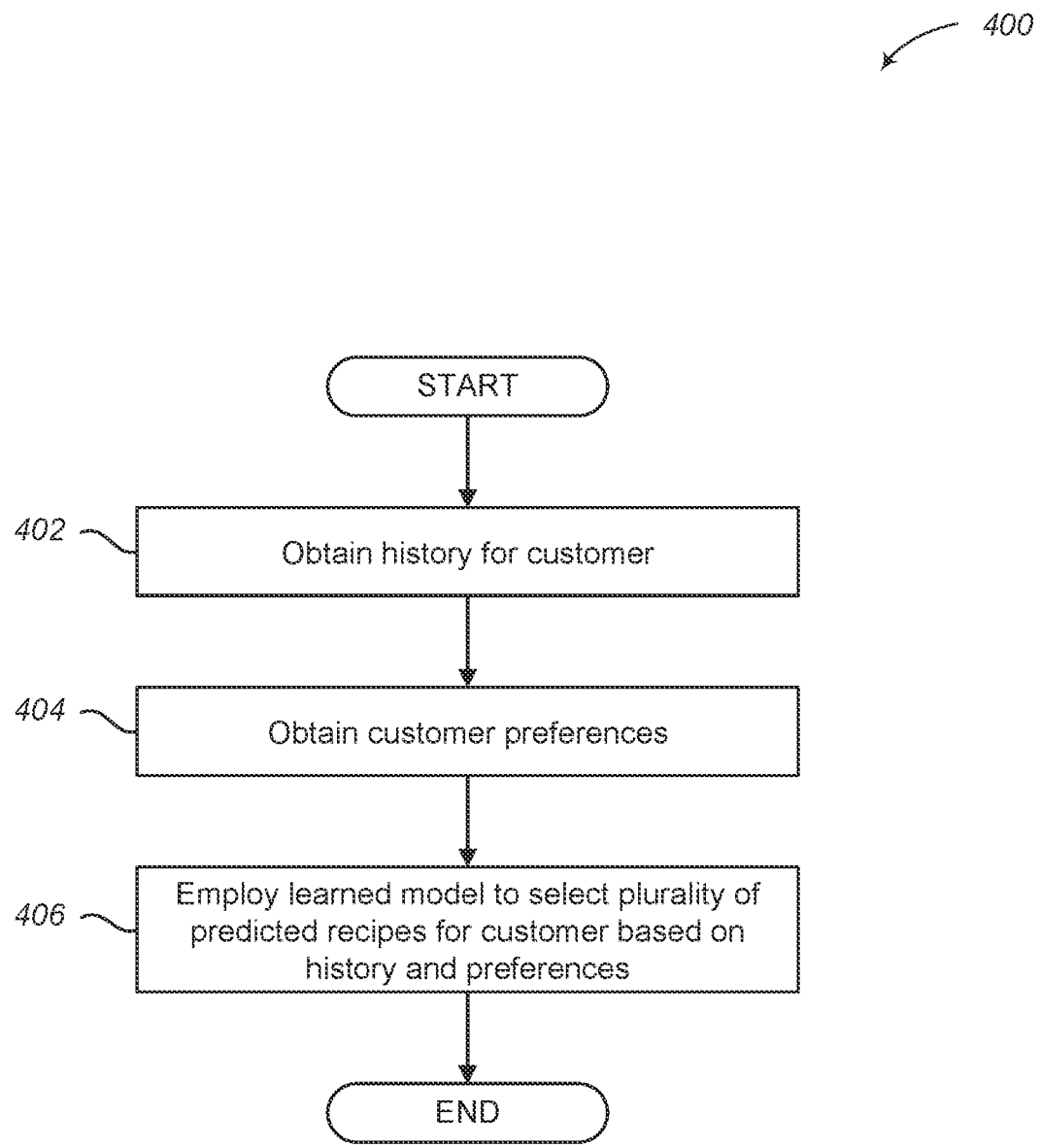
FIG. 4 illustrates a logical flow diagram showing one embodiment of a process for predicting recipes for a customer in accordance with embodiments described herein.

FIG. 4 illustrates a logical flow diagram showing one embodiment of a process 400 for predicting recipes for a customer in accordance with embodiments described herein. As mentioned above, process 400 may be performed at block 308 in FIG. 3.

Process 400 begins, after a start block, at block 402, where a history for the customer is obtained. In various embodiments, the customer's history includes previous recipes selected for the customer, ratings provided by the customer on previous recipes, ratings provided by the customer on previous recipe combinations in a set of recipes, previous alterations or customizations provided by the customer, etc. For example, the customer history may indicate that each previously selected recipe containing beef is modified by the customer to exchange the beef for chicken. As another example, the customer history may indicate that the customer gives high ratings to recipe sets that include Italian recipes with French recipes in the same set. Other customer history information can also be obtained.

Process 400 proceeds to block 404, where one or more customer preferences are obtained. In various embodiments, these customer preferences are selected by the customer when the customer signs up to have recipe sets and corresponding items delivered to the customer. In other embodiments, the customer preferences are automatically generated based on questions answered by the customer. In yet other embodiments, the customer preferences may be inferred from the customer's actions or interactions with the system. The customer preferences may include, but are not limited to customer dietary preferences, customer dietary restrictions, customer configurations (e.g., number of servings per recipe, preferred cuisines, etc.), Process 400 continues at block 406, where a learned model is employed to select a plurality of predicted recipes for the customer based on the customer history and the customer preferences.

In various embodiments, the model is trained using one or more artificial intelligence or machine learning techniques. The training data may include item attributes, recipe attributes (e.g., items or ingredients, item quantities, number of steps, preparation time, cook time, etc.), customer dietary preferences, customer dietary restrictions, customer configurations, and past customer customizations of items from a plurality of customers for a plurality of previously selected recipes for those customers. The item attributes may include information describing various aspects of an item, which may include a list of ingredients, dietary information (e.g., number of calories, amount of sugar, amount of fat, etc.), allergens, dietary restrictions (e.g., vegan, dairy free, gluten free, etc.), or other information regarding the item. The customer dietary preferences may include a customer's food likes and dislikes, such as the types of cuisines the customers like or dislike, specific food items that the customer would prefer or would prefer to not have, etc. The customer dietary restrictions may include different types of diets, food fads, common food allergies (e.g., nut allergies, dairy allergies, or oral allergy syndrome), etc. of a customer. The customer configurations may include selections and preferences of a customer, such as the number of meals, types of meals (e.g., dinner, lunch, breakfast, snack, or dessert), requested numbers of recipes in a set of recipes, etc. The past customer customizations may include information indicating which recipe or item alterations, exchanges, or changes a customer has made to specific recipes. In some embodiments, the training data may also include customer feedback, such as how the customer rated or liked items or recipes that they have previous received. In other embodiments, the training data may include customer attributes that are not directed related to recipes or items or information inferred about a customer, such as demographics, geographic location, income and budget, etc.

In some embodiments, the model may be trained for specific geographic area, for specific dietary needs, for specific customer demographics, or other grouping criteria. In this way, the predicted recipes may be more closely tailored to the customer.

After block 406, process 400 may terminate or otherwise return to a calling process to perform other embodiments. For example, process 400 may return the predicted recipes to process 300 in FIG. 3 for further processing.

Figure 5:
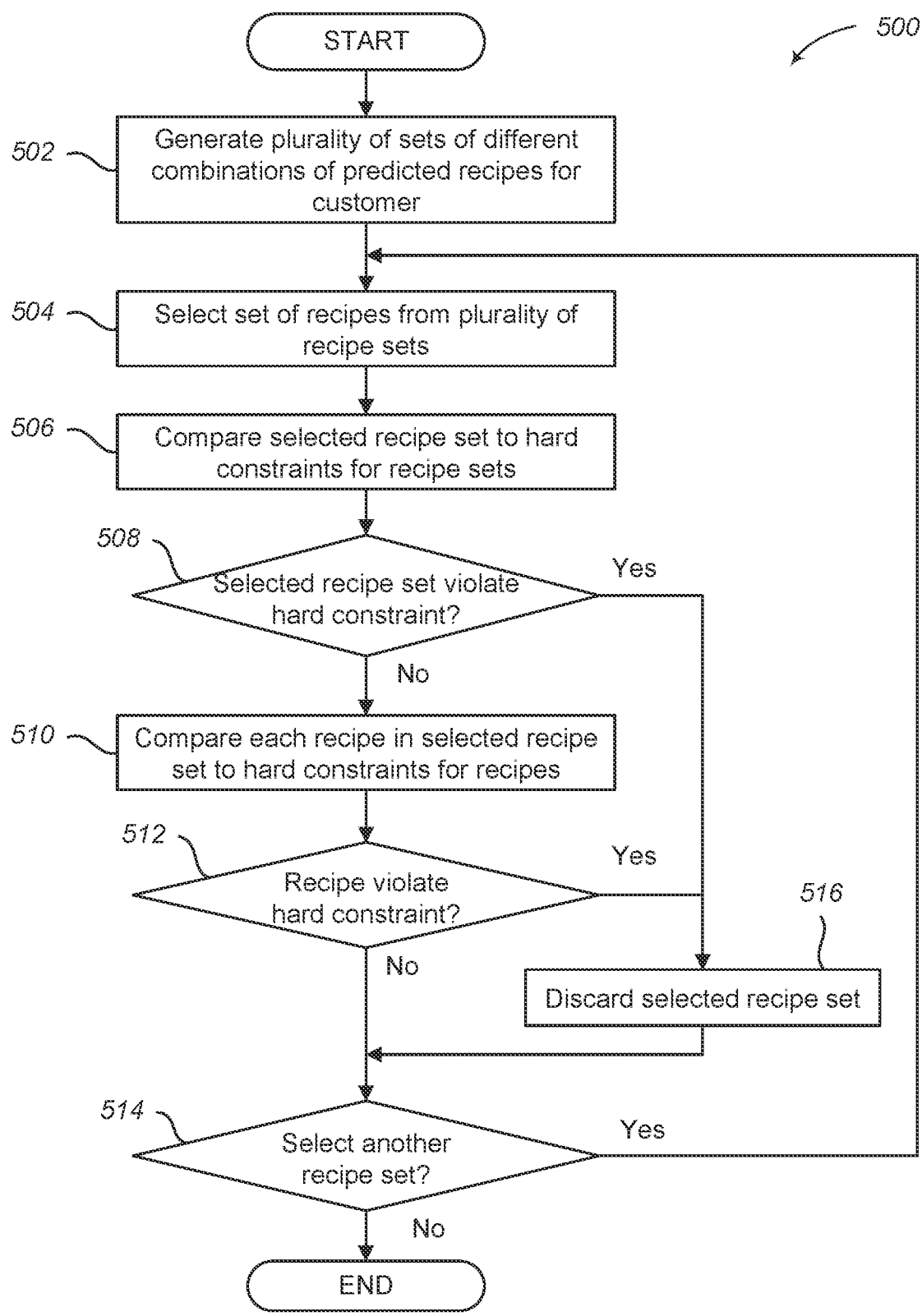
FIG. 5 illustrates a logical flow diagram showing one embodiment of a process for optimizing and scoring predicted recipes for a customer in accordance with embodiments described herein.

FIG. 5 illustrates a logical flow diagram showing one embodiment of a process 500 for scoring predicting recipes for a customer in accordance with embodiments described herein. As mentioned above, process 500 may be performed at block 310 in FIG. 3.

Process 500 begins, after a start block, at block 502, where a plurality of sets of different combinations of predicted recipes is generated. The predicted recipes may be generated as discussed above, such as in conjunction with FIG. 4. A set of recipes is a set that includes one or more recipes. In various embodiments, each possible combination of predicted recipes is generated.

Process 500 proceeds to block 504, where a set of recipes is selected from the plurality of sets of recipes. Each recipe set may be selected in a logical order such that each recipe set is compared to the hard constraints.

Process 500 continues at block 506, where the selected recipe set is compared to the hard constraints for recipe sets. As discussed herein, the hard constraints may be in two groups, a first group of one or more hard constraints that are evaluated at the recipe-set level and a second group of one or more hard constraints that are evaluated at the recipe level. At block 506, the selected recipe set is compared to or evaluated with respect to the first group of hard constraints at the recipe-set level.

In various embodiments, one or more pieces of information associated with each recipe or each item of each recipe of the selected recipe set is obtained, analyzed, and compared to the hard constraints. For example, the selected recipe set may be analyzed to ensure that the selected recipe set does not have a cost that exceeds a customer-selected maximum cost. Similarly, the selected recipe set may be analyzed to ensure that the total packaging volume of all the items for each recipe in the selected recipe set does not exceed a maximum packaging volume. As another example, the selected recipe set may be analyzed to ensure that the total number of items associated with the selected recipe set does not exceed a maximum number of items. These examples are for illustrative purposes and other hard constraints may be employed and evaluated on the selected recipe set.

Process 500 proceeds next to decision block 508, where a determination is made whether the selected recipe set violates at least one hard constraint. If the selected recipe set violates at least one hard constraint, then process 500 flows to block 516; otherwise, process 500 flows to block 510.

At block 510, each recipe associated with the selected recipe set is individually compared to the second group of hard constraints that are evaluated at the recipe level. In various embodiments, one or more pieces of information associated with each recipe or each item of each recipe of the selected recipe set is obtained, analyzed, and compared to the hard constraints. For example, each recipe in the recipe set may be analyzed to ensure that no recipe in the recipe set includes an item that is an allergen to the customer. Similarly, each recipe in the recipe set may be analyzed to ensure that no recipe includes an item that is restricted or prohibited by the customer. A restricted item may be an item that the customer really does not want (e.g., the customer hates the taste of tofu), whereas a prohibited item may be an item that the customer cannot consume (e.g., the customer is allergic to peanuts). These examples are for illustrative purposes and other hard constraints may be employed and evaluated on each recipe for the selected recipe set.

Process 500 continues as decision block 512, where a determination is made whether a recipe in the selected recipe set violates at least one hard constraint. If at least one recipe violates at least one hard constraint, then process 500 flows to block 516; otherwise, process 500 flows to decision block 514.

At block 516, the selected recipe set is determined to be in violation of at least one hard constraint and is therefore discarded from the sets of recipes that can be selected and provided to the customer. After block 516, process 500 flows to decision block 514.

At decision block 514, a determination is made whether another recipe set is selected from the plurality of sets of recipes. In some embodiments, each recipe set is selected and compared to the hard constraints. If another recipe set is to be selected, process 500 loops to block 504; otherwise, process 500 terminates or otherwise returns to a calling process to perform other actions. For example, process 500 can return to process 300 in FIG. 3 to select one of the remaining recipe sets to provide to the customer.

Figure 6:
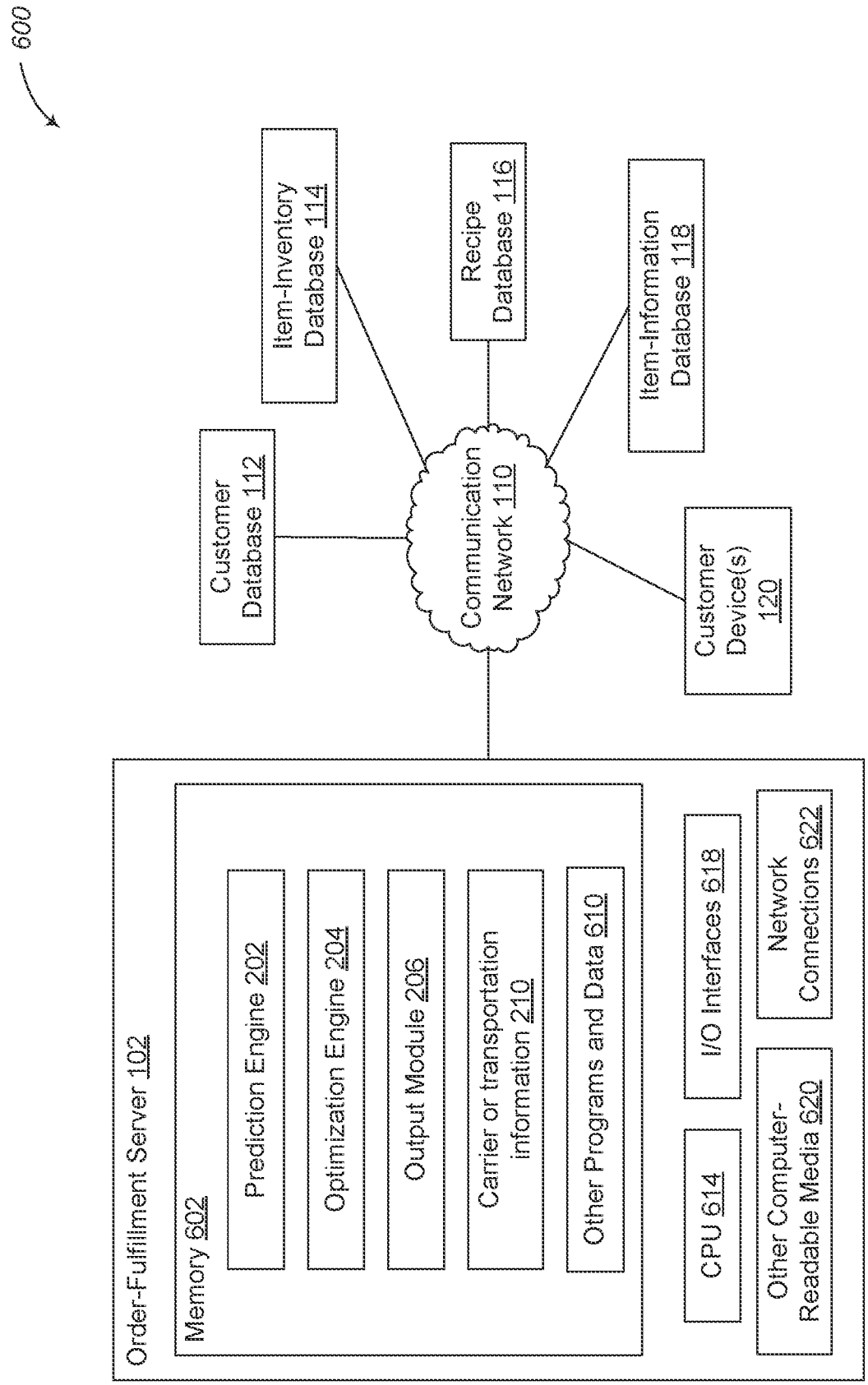
FIG. 6 shows a system diagram that describes various implementations of computing systems for implementing embodiments described herein.

FIG. 6 shows a system diagram that describes various implementations of computing systems for implementing embodiments described herein. System 600 includes an order-fulfillment server 102, customer database 112, item-inventory database 114, recipe database 116, item-information database 118, and customer devices 120, which may communicate with one another via network 110.

The order-fulfillment server 102 receives an order request for a customer from a customer device 120, predicts which recipes the customer will enjoy, optimizes those predicted recipes into a plurality of sets of recipes, and selects a set of recipes to provide to the customer, as described herein. One or more special-purpose computing systems may be used to implement the order-fulfillment server 102. Accordingly, various embodiments described herein may be implemented in software, hardware, firmware, or in some combination thereof. The order-fulfillment server 102 may include memory 602, one or more central processing units (CPUs) 614, I/O interfaces 618, other computer-readable media 620, and network connections 622.

Memory 602 may include one or more various types of non-volatile and/or volatile storage technologies. Examples of memory 602 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 602 may be utilized to store information, including computer-readable instructions that are utilized by CPU 614 to perform actions, including embodiments described herein.

Memory 602 may have stored thereon prediction engine 202, optimization engine 204, and output module 206. The prediction engine 202 is configured to utilize customer preferences and historical customer actions to predict which recipes the customer will enjoy, as described herein. The optimization engine 204 is configured to obtain the predicted recipes from the prediction engine 202 and generate a plurality of optimized sets of recipes, as described herein. The output module 206 is configured to select one of the optimized sets of recipes and initiate the fulfillment of the customer's order, as described herein. In various embodiments, the prediction engine 202, the optimization engine 204, and the output module 206 may communicate with the customer database 112, the item-inventory database 114, the recipe database 116, or the item-information database 118 to obtain various information utilized in the prediction and optimization of recipes for a customer. Although the prediction engine 202, the optimization engine 204, and the output module 206 are illustrated as separate components, embodiments are not so limited. Rather, one or more computing components or modules may be employed to perform the functionality of the prediction engine 202, the optimization engine 204, and the output module 206.

Memory 502 may also store carrier or transportation information 210 and other programs and data 610. The carrier or transportation information 210 may include information or details regarding a current status of item carriers, previous transportation behavior or results of item carriers or order delivery transportation services, etc. Although the carrier or transportation information 210 is illustrated as being stored in memory 602 of the order-fulfillment server 102, embodiments are not so limited. In some embodiments, the carrier or transportation information 210 may be stored by another database or computing device that is separate or remote from the order-fulfillment server 102. The other programs and data 610 may include operating systems or other information. For example, in some embodiments, the data stored by the customer database 112, the item-inventory database 114, the recipe database 116, or the item-information database 118, or some combination thereof, may be stored in the memory 602 of the order-fulfillment server 102.

In various embodiments, the network connections 622 include transmitters and receivers (not illustrated) to send and receive data as described herein. I/O interfaces 618 may include one or more data input or output interfaces that can be used to receive information from or display information to an administrator. For example, the I/O interfaces 618 may include an input interface to receive hard constraints, soft constraints, or modifications thereof. Other computer-readable media 620 may include other types of stationary or removable computer-readable media, such as removable flash drives, external hard drives, or the like.

The order-fulfillment server 102, the customer database 112, the item-inventory database 114, the recipe database 116, the item-information database 118, and the customer devices 120 are described in more detail above. The customer database 112, the item-inventory database 114, the recipe database 116, and the item-information database 118 utilize processors, memory, network connections, and other computing components similar to the order-fulfillment server 102. But those components are not illustrated in FIG. 6 to improve readability of the figure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computing system, comprising:
a recipe database that stores a plurality of recipes;
an item-inventory database that stores inventory information regarding a plurality of items associated with the plurality of recipes;
a customer database that stores preferences and order histories for a plurality of customers; and
an item-selection server that includes:
a memory that stores computer instructions; and
a processor that is configured to execute the computer instructions to:
train an artificial intelligence model to select a plurality of predicted recipes based on at least two criteria selected from item attributes, customer dietary preferences, customer dietary restrictions, customer configurations, and past customer customizations of items;
receive a request for an order for a customer;
obtain one or more hard constraints for the customer and the order, wherein the one or more hard constraints define at least one first parameter that cannot be violated by a recipe or set of recipes for the customer;
obtain one or more soft constraints for the order, wherein the one or more soft constraints define at least one second parameter that expresses a tradeoff value associated with a recipe or set of recipes for the customer;
employing the artificial intelligence model to select the plurality of predicted recipes from the plurality of recipes in the recipe database for the order based on preferences of the customer and an order history of the customer;
generate a plurality of sets of recipes from the plurality of predicted recipes based on the one or more hard constraints, including:
select a maximum number of recipes for each set of the plurality of sets of recipes;
generate a plurality of possible sets of recipes to include different combinations of predicted recipes from the plurality of predicted recipes based on the maximum number of recipes in a set;
generate a list of items for each of the plurality of possible sets;
determine a packaging volume for the list of items for each of the plurality of possible sets; and
generate the plurality of sets of recipes by discarding one or more sets from the plurality of possible sets in response to the one or more sets having a packaging volume that exceeds a selected threshold;
score each recipe set of the plurality of sets of recipes based on the one or more soft constraints, an inventory of items for the plurality of sets of recipes obtained from the item-inventory database, and the preferences of the customer obtained from the customer database;
select a set of recipes for the order based on the scores of the plurality of sets of recipes;
initiate filling the order for the customer with items associated with the selected set of recipes;
receive feedback from the customer regarding the selected set of recipes; and
retrain the artificial intelligence model to select the plurality of predicted recipes based on the feedback.

2. The computing system of claim 1, wherein the processor of the item-selection server trains the artificial intelligence model by being configured to further execute the computer instructions to:
train the artificial intelligence model using the preferences and the order histories of the plurality of customers.

3. The computing system of claim 1, wherein the processor of the item-selection server generates the plurality of sets of recipes by being configured to further execute the computer instructions to:
generate the plurality of sets of recipes by discarding one or more sets from the plurality of possible sets in response to a recipe in the one or more sets having an item that is an allergen to the customer.

4. The computing system of claim 1, wherein the processor of the item-selection server generates the plurality of sets of recipes by being configured to further execute the computer instructions to:
generate the plurality of sets of recipes by discarding one or more sets from the plurality of possible sets in response to a recipe in the one or more sets having an item that is restricted by the customer.

5. The computing system of claim 1, wherein the processor of the item-selection server generates the plurality of sets of recipes by being configured to further execute the computer instructions to:
generate the plurality of sets of recipes by discarding one or more sets from the plurality of possible sets in response to a recipe or an item in the one or more sets being prohibited by the customer.

6. The computing system of claim 1, wherein the processor of the item-selection server generates the plurality of sets of recipes by being configured to further execute the computer instructions to:
generate a list of items for each of the plurality of possible sets;
generate the plurality of sets of recipes by discarding one or more sets from the plurality of possible sets in response to the one or more sets having a number of items in the list of items exceeding a selected threshold.

7. The computing system of claim 1, wherein the processor of the item-selection server scores each recipe set of the plurality of sets of recipes by being configured to further execute the computer instructions to:
for each corresponding set of the plurality of sets:
generate a list of items for recipes in the corresponding set;
determine an inventory availability of each item in the list of items for the corresponding set; and
modify the score of the corresponding set based on the determined inventory availability.

8. The computing system of claim 1, wherein the processor of the item-selection server scores each recipe set of the plurality of sets of recipes by being configured to further execute the computer instructions to:
receive a customer-selected maximum cost and a customer-selected minimum cost for each set of the plurality of sets; and
for each corresponding set of the plurality of sets:
generate a list of items for recipes in the corresponding set;
determine a cost for the corresponding set based on a price of each item in the list of items for the corresponding set; and
modify the score of the corresponding set based on the determined cost relative to the customer-selected maximum cost and the customer-selected minimum cost.

9. The computing system of claim 1, wherein the processor of the item-selection server scores each recipe set of the plurality of sets of recipes by being configured to further execute the computer instructions to:
receive a customer-selected number of meals for each set of the plurality of sets; and
for each corresponding set of the plurality of sets:
determine a number of meals associated with the corresponding set; and
modify the score of the corresponding set based on the determined number of meals being over or under the customer-selected number of meals.

10. The computing system of claim 1, wherein the processor of the item-selection server scores each recipe set of the plurality of sets of recipes by being configured to further execute the computer instructions to:
receive a customer-selected number of meals for a selected mealtime for each set of the plurality of sets; and
for each corresponding set of the plurality of sets:
determine a number of meals associated with the corresponding set for the selected mealtime; and
modify the score of the corresponding set based on the determined number of meals being over or under the customer-selected number of meals for the selected mealtime.

11. The computing system of claim 1, wherein the processor of the item-selection server scores each recipe set of the plurality of sets of recipes by being configured to further execute the computer instructions to:
for each corresponding set of the plurality of sets:
modify the score of the corresponding set based on a recipe in the corresponding set being previously provided to the customer.

12. The computing system of claim 1, wherein the processor of the item-selection server scores each recipe set of the plurality of sets of recipes by being configured to further execute the computer instructions to:
for each corresponding set of the plurality of sets:

modify the score of the corresponding set based on two recipes in the corresponding set having at least one overlapping item.

13. The computing system of claim 1, wherein the processor of the item-selection server scores each recipe set of the plurality of sets of recipes by being configured to further execute the computer instructions to:
   receive at least one customer-selected preference for each set of the plurality of sets; and
   for each corresponding set of the plurality of sets:
      increasing the score of the corresponding set in response to the corresponding set matching the at least one customer-selected preference.

14. The computing system of claim 1, wherein the processor of the item-selection server scores each recipe set of the plurality of sets of recipes by being configured to further execute the computer instructions to:
   receive at least one customer-selected preference for each set of the plurality of sets; and
   for each corresponding set of the plurality of sets:
      decreasing the score of the corresponding set in response to the corresponding set failing to match the at least one customer-selected preference.

15. The computing system of claim 1, wherein the processor of the item-selection server scores each recipe set of the plurality of sets of recipes by being configured to further execute the computer instructions to:
   modify the score of at least one set of the plurality of sets of recipes based on inventory availability and preferences of at least one other customer.

16. A method, comprising:
   training, by a computing device, an artificial intelligence model to predict a plurality of recipes based on at least two criteria selected from item attributes, customer dietary preferences, customer dietary restrictions, customer configurations, and past customer customizations of items;
   receiving, by the computing device, a request for an order for a customer;
   employing, by the computing device, the artificial intelligence model to predict the plurality of recipes for the order based on preferences of the customer and an order history of the customer;
   generating, by the computing device, a plurality of sets of recipes from the plurality of predicted recipes based on at least one first constraint that cannot be violated by a recipe or set of recipes for the customer;
   receiving, by the computing device, a customer-selected number of meals for each set of the plurality of sets of recipes;
   optimizing, by the computing device, the plurality of sets of recipes based on at least one second constraint that expresses a tradeoff value associated with a recipe or set of recipes for the customer, including:
      for each corresponding recipe set of the plurality of sets of recipes:
         determining, by the computing device, a number of meals associated with the corresponding recipe set; and
         scoring, by the computing device, the corresponding recipe set based on the determined number of meals being over or under the customer-selected number of meals;
   selecting, by the computing device, a set of recipes for the order based on the optimized plurality of sets of recipes;
   initiating, by the computing device, filling the order for the customer with items associated with the selected set of recipes;
   receiving, by the computing device, feedback from the customer regarding the selected set of recipes; and
   retraining, by the computing device, the artificial intelligence model to predict the plurality of recipes based on the feedback.

17. The method of claim 16, wherein scoring the corresponding recipe set comprises:
   scoring, by the computing device, the corresponding recipe set based on the at least one second constraint, an inventory of items for the plurality of sets of recipes, and preferences of the customer.

18. The method of claim 16, wherein optimizing the plurality of sets of recipes comprises:
   discarding sets of recipes that include a recipe having an item that is an allergen to the customer;
   discarding sets of recipes that include a recipe having an item or recipe that is restricted by the customer;
   discarding sets of recipes that include a recipe having an item that is an allergen to the customer; and
   scoring remaining sets of recipes based on inventory availability of items for recipes in each corresponding set of recipes, a cost of each corresponding set of recipes relative to a customer-selected cost, the number of meals associated with each corresponding set of recipes relative to the customer-selected number of meals, a packaging volume of items for recipes in each corresponding set of recipes, and a history of previously provided recipes to the customer.

19. A non-transitory computer-readable medium storing computer instructions that, when executed by at least one processor, cause the at least one processor to perform actions, the actions comprising:
   training an artificial intelligence model to predict a plurality of recipes based on at least two criteria selected from item attributes, customer dietary preferences, customer dietary restrictions, customer configurations, and past customer customizations of items;
   receiving a request for an order for a customer;
   employing the artificial intelligence model to predict a plurality of recipes for the order based on preferences of the customer and an order history of the customer;
   generating a plurality of sets of recipes from the plurality of predicted recipes based on one or more hard constraints, wherein the one or more hard constraints define at least one first parameter that cannot be violated by a recipe or set of recipes for the customer;
   receiving a customer-selected number of meals for a selected mealtime for each set of the plurality of sets of recipes;
   determining a number of meals associated with each set of the plurality of sets of recipes for the selected mealtime;
   optimizing the plurality of sets of recipes based on one or more soft constraints and the determined number of meals for each set being over or under the customer-selected number of meals for the selected mealtime, wherein the one or more soft constraints define at least one second parameter that expresses a tradeoff value associated with a recipe or set of recipes for the customer, including;
   selecting a set of recipes for the order based on the optimized plurality of sets of recipes;
   initiating filling the order for the customer with items associated with the selected set of recipes;

receiving feedback from the customer regarding the selected set of recipes; and retraining the artificial intelligence model to predict the plurality of recipes based on the feedback.

\* \* \* \* \*